April 27, 1965 A. WOLFENSPERGER 3,180,351
LUBRICATED BALL TYPE VALVE
Filed July 12, 1955 7 Sheets-Sheet 1

INVENTOR
ADOLPH WOLFENSPERGER
BY Strauch, Nolan & Diggins
ATTORNEYS

April 27, 1965     A. WOLFENSPERGER     3,180,351
LUBRICATED BALL TYPE VALVE

Filed July 12, 1955     7 Sheets-Sheet 3

INVENTOR
ADOLPH WOLFENSPERGER

BY Strauch, Nolan & Diggins

ATTORNEYS

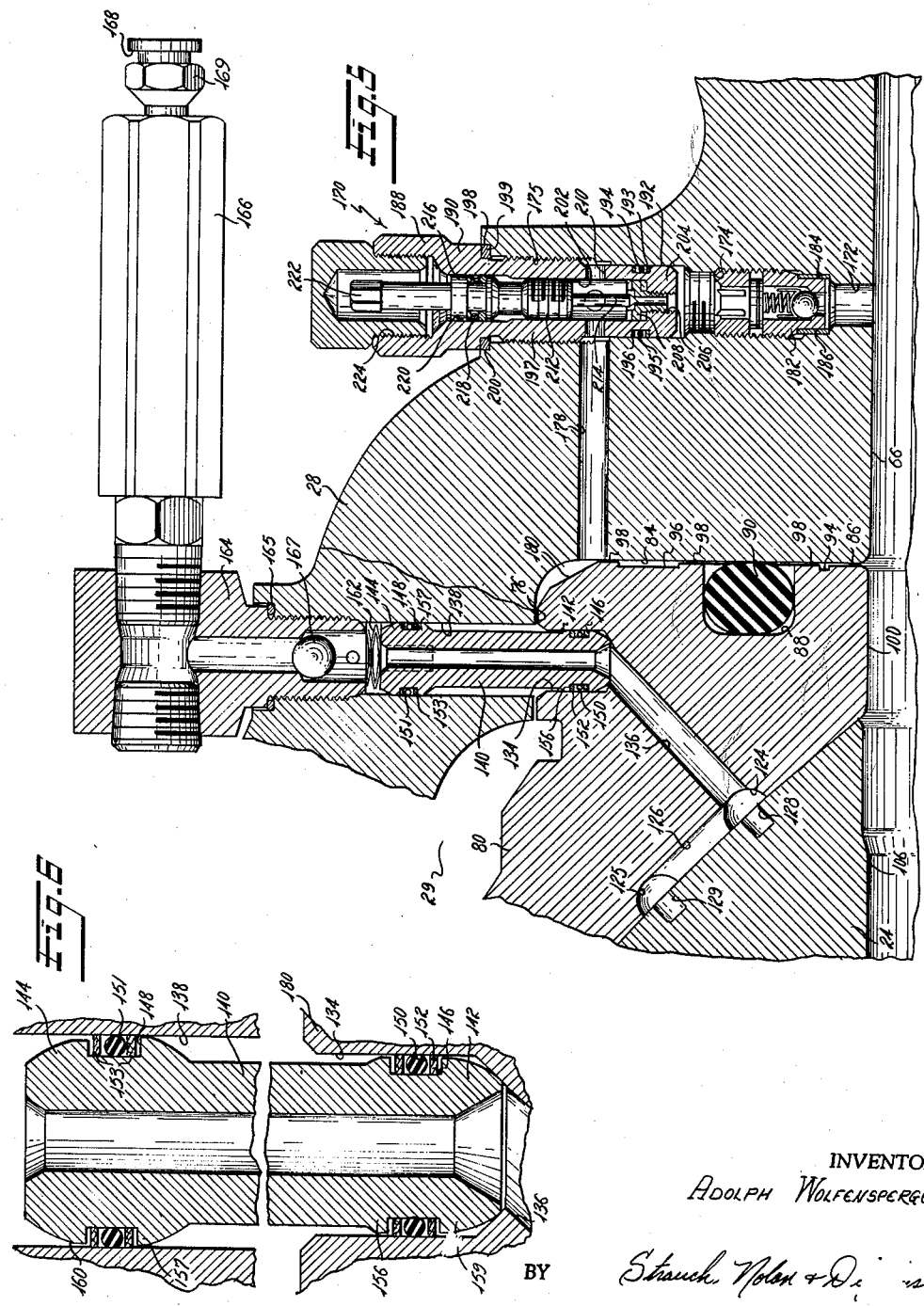

INVENTOR
ADOLPH WOLFENSPERGER
BY Shauch, Nolan & Diggins
ATTORNEYS

April 27, 1965   A. WOLFENSPERGER   3,180,351
LUBRICATED BALL TYPE VALVE
Filed July 12, 1955   7 Sheets-Sheet 6

INVENTOR
ADOLPH WOLFENSPERGER
BY Strauch, Nolan & Diggins
ATTORNEYS

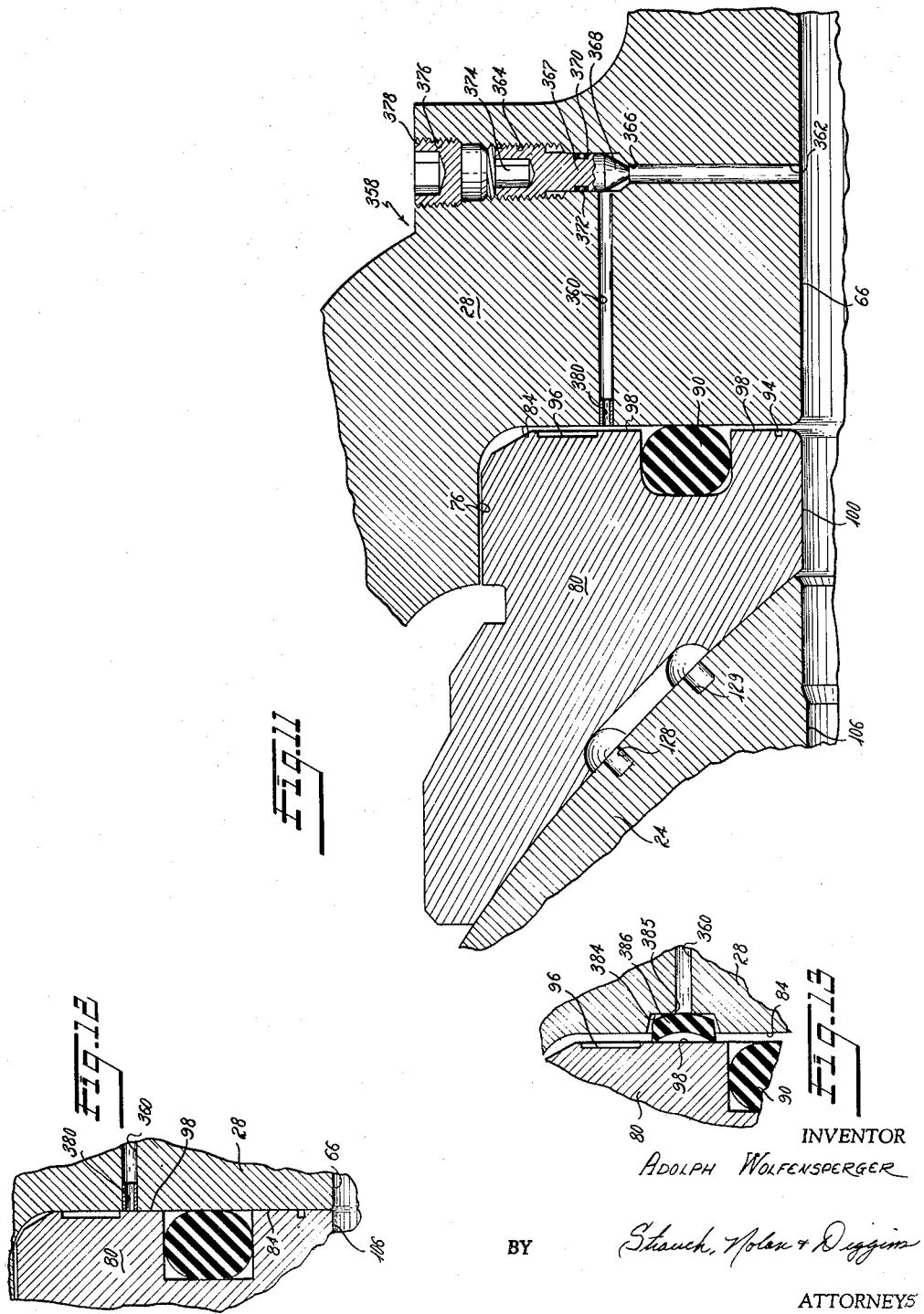

3,180,351
LUBRICATED BALL TYPE VALVE
Adolph Wolfensperger, Pittsburgh, Pa., assignor to Rockwell Manufacturing Company, Pittsburgh, Pa., a corporation of Pennsylvania
Filed July 12, 1955, Ser. No. 521,495
16 Claims. (Cl. 137—246.18)

This invention relates to ball type valves for use in large high pressure fluid pipe lines up to 30 inches and more in diameter and is particularly directed to lubricated valves this kind and includes improvements in the spherical seated plug and its operating means, the axially shiftable seat rings, and plastic lubricant sealing and jacking arrangements.

The preferred embodiment illustrated in the drawings is specifically that of a chiefly spherical plug valve with a thirty inch diameter through port in the plug. Because the weight of the plug in large valves of this type is increased enormously relative to the plugs in smaller size valves with resultant increased operating torque, the plug of the present invention has been formed with the specific object of keeping its weight as low as practicable while still providing the requisite strength and rigidity for proper operation. In large valves it is possible to core the plug to obtain relatively thin walls reinforced with various combinations of internal ribbing. Distortion of the relatively thin walls of the hollow plug is alleviated by admitting fluid under line pressure to the valve body cavity with uniform distribution throughout the open cores of the plug thus avoiding pressure differentials that would normally cause undesirable stresses and deformation. To further reduce plug weight, substantially all portions of the plug except those containing the spherical seating surfaces and defining the actuating stem slot and the through port have been removed.

A novel arrangement has been provided for introducing line pressure fluid to the valve body cavity and thus to the open cored portions of the plug at all times during valve open and closed positions, and this includes high pressure control valves for optionally shutting off such fluid. A new axially shiftable ring structure is provided in this improved valve and, due to pressure rating and proportions of the present plug, it is possible to make it of high tensile strength iron which is more economical than the materials previously used and yet does not impair the quality of function of the valve. During tests with this new seat ring structure it was discovered that the effective jacking area of a lubricant groove in an axially and radially floating valve ring seat is greater than the actual groove area. It is believed this increase in effective areas is due to the fact that in practice lubricant starts to force its way into areas adjacent the groove to thereby exert a jacking force over a wider area. The additional area penetrated between the spherical surface of the plug and the ring seat will depend upon surface irregularities and elastic deflections of the mating parts. Using this important discovery in the seat ring of this invention, two (or more) side by side small grooves are used in lieu of one groove equal in width to the total width of the two small grooves, and test results indicate that the seat ring using two small grooves provides improved lubricant distribution and will provide jacking force, between the seated areas adjacent the lubricant grooves, more than twice that provided by a single groove equal in width to the two small grooves. Thus it is possible to use a plurality of small grooves and obtain the same jacking force as one large groove of the same total groove width, which enables the use of a narrower seating ring of the same seating surface area.

Prior to the present invention it had been proposed to mount these axially shiftable seat rings in recesses in the valve body with rubber or like O-rings surrounding the seat rings to provide peripheral seals with the valve body. In the present invention the O-ring seals are mounted in annular grooves in the rear surfaces of the seat rings where they are axially compressed against axially facing body walls. This permits limited radial float of the seat rings to automatically align with the ball and saves machining costs during manufacture since the peripheries of the rings and the associated body recesses can be made with increased tolerances. Also the accuracy of machining the ball seating surfaces can be reduced with resulting lowering of manufacturing costs.

When the valve is closed, the ball is being pressed against the downstream seat ring by the upstream pressure. The axially floating downstream seat ring is therefore forced against the valve body, taking up any clearance between the opposed plane side surfaces of the seat ring and the body. If the O-ring were disposed on the cylindrical peripheral surface of the seat ring, as heretofore proposed, and sufficient clearance provided in a radial sense to allow enough radial floating of the seat ring to obtain alignment with the ball seating surface, that clearance would provide a space into which a peripherally disposed O-ring would be extruded, mutilated and deformed by the line fluid pressures within the valve. By the present arrangement, the O-ring being disposed on a radial plane end surface rather than on a cylindrical surface of the ring seat obviates such a difficulty.

The total axial clearance between the seat rings and the valve body in a 30 inch valve may for example be in the order of 0.005 inch to 0.020 inch when the valve is assembled and may become more or less when line pressure is applied or when longitudinal forces are exerted by expansions and contractions of the pipe line. When the valve is open the large O-rings at the end walls of the seat rings, each having a cross-sectional diameter of approximately one inch and compressed in assembly approximately one-eighth inch, by their inherent resilience tend to center the seat rings and ball inside the valve body cavity with equal clearance between the back face of each seat ring and its valve body seat. The O-rings also provide a fluid tight seal between the back face of the seat ring and the valve body and, when the valve is closed, line pressure on the plug forces the downstream seat ring into tight metal to metal contact with the body further enhancing the sealing function of the downstream O-ring. In valve closed condition the resilient upstream O-ring holds the upstream seat ring in full surface contact with the ball and away from the valve body, and permits line fluid pressure to enter and bias the seat ring against the ball. Equal fluid pressures on the line side and body cavity side of the upstream O-ring eliminates any tendency toward extrusion of the O-ring out of its groove.

The floating characteristics of this novel seat ring, with the aforementioned axial and radial clearances and freedom to move axially and radially in the valve body, permits entrance of line fluid behind the rings. Therefore it is desirable that provision be made for preventing foreign particles in the line fluid from being deposited behind the back face seating surfaces of the seat rings which could accumulate to block axial shift of the rings. To prevent such deposits, shallow grooves are provided in the back faces of the seat rings which separate the surface into relatively narrow lands that will have less tendency to trap foreign particles than a wide flat seat would have. It is believed that high bearing pressures between the narrow lands and the valve body will tend to induce a flow by squeezing action to carry any foreign particles into the grooves or back into the valve body port.

To provide proper transfer of lubricant from the exterior of the valve body to the lubricant grooves in the floating seat rings, an improved non-flexible universally rockable lubricant bushing coacts between the valve body and the cylindrical periphery of the floating seat ring. The lubricant bushings and their seals are specifically designed to hold high lubricant pressures acting towards the space between the bushing and the interior of the valve body. The bushing seals and seal retaining lands are shaped to prevent the bushing from binding whenever it is rocked by a displacement of the ring seat.

Because of the floating characteristics of the ball a floating connection between the ball and its actuating stem is provided to permit axial shift of the ball with respect to the fixed axis stem. To eliminate specific problems arising from a conventional screw thread type stem actuator rotatable through 90°, this invention incorporates a threadless operating stem provided with a special journalling and sealing arrangement.

A suitable valve operator may be used for power actuation of this valve. Because of the weight and resultant high torques realized in this large valve, improvements have been made in the operator mechanism which constitute part of the present invention. One particular improvement resides in the provision of an improved rack guide means to reduce friction losses in the gear racks.

Accordingly the major object of my invention is to provide a special ball type valve for use in large diameter pipe lines and other high fluid pressure services requiring a valve opening and embodying novel structural cooperation between the ball and special floating seat ring construction.

A further object of my invention is to provide a ball type valve embodying a ball with spherical seat zones coacting on lubricated surfaces with floating seating rings provided with annular resilient seals on their outer end faces and incorporating sufficient non-critical radial clearance to enable full-floating and self-centering positioning of the seat rings and ball in operation.

A still further object of my invention is to provide a novel lubricated ball type valve providing maximum jacking force with minimum lubricant groove area in the ball seating surfaces.

A further object of my invention is to provide a novel lubricated ball plug type valve wherein a floating seat ring for the ball is provided with one or more lubricating grooves and a special non-flexible lubricant conducting bushing is rockably mounted between the valve casing and the floating ring for introducing lubricant to the seating surfaces in all relative positions of the ring and ball.

A still further object of my invention resides in providing a lubricated plug valve wherein the plug is generally spherical and of hollow core construction and means are provided for introducing line fluid pressure into the valve body cavity and around the interior walls of the cored plug member to relieve differential pressure stresses in the plug walls.

A still further object resides in providing the end faces of the floating seat rings with special grooves to prevent accumulation of foreign particles from the line fluid from being trapped between the seating rings and the valve body.

A still further object of my invention is to provide a novel lubricated two directional valve assembly having interchangeable floating valve seat rings which seal against leakage past the seating surfaces and around the rings.

Still another object of my invention is to provide a novel sealing floating lubricated valve seat utilizing an annular resilient ring to provide resilient backing and line sealing between the seat rings and the valve body.

A further object resides in a combined plug valve and operator wherein the valve plug, seats, stem and operator are so arranged and constructed to enable valve operation with minimum operating torque.

Another object resides in an improved power operator of the rack and pinion type with an adjustable low friction rack guide.

It is an object of the invention to provide in a ball type valve a seat ring arrangement wherein the ring is mounted for limited axial and radial float and is resiliently backed by a resilient sealing annulus that does not hamper radial displacement.

It is a further object of the invention to provide a ball type lubricated plug valve assembly wherein the ball plug is cradled within the valve body wholly on spherically surfaced seat rings that are capable of both axial and radial float in the assembly.

A further object of the invention is to provide a seat ring for a lubricated ball type valve wherein the seating surface is an annular zone of spherical contour and is provided with side by side annular lubricant distribution grooves connected at one or more intervals by at least one cross groove.

A further object of the invention is to provide a novel seat ring construction and mounting in a ball type valve wherein a valved conduit is provided to supply line fluid under pressure to the back of the seat ring.

Further novel features and objects of this invention will become apparent from the following detailed description and the appended claims taken in conjunction with the accompanying drawings showing a preferred embodiment thereof, in which:

FIGURE 5 is an enlarged detail section view of the plug, floating seat and valve body showing a lubrication fitting and line fluid by-pass valve from the upstream valve port to the valve body cavity;

FIGURE 6 is an enlarged detail section view of the lubricating bushing shown in FIGURE 5;

FIGURE 10 is an enlarged detail section of the novel rack guide roller;

FIGURE 11 is an enlarged detail section through the casing and upstream seat ring illustrating an expansion by-pass valve from the valve body cavity;

FIGURE 12 is a partial detail section similar to FIGURE 11 showing the downstream seat ring; and FIGURE 13 is a partial detail section similar to FIGURE 11 showing a modified by-pass passage.

The drawings illustrate a thirty inch sphere valve embodiment wherein the relative dimensions and various structural reinforcing ribs and members having been designed for use in a specific system. The large size of the ball plug in this valve makes it possible to use various combinations of internal ribbing and also to vary the wall thickness depending upon the strength and rigidity required in the specific installation.

Wherever the terms "upper," "lower" and other indications of relative positions are used in the specification and claims, reference is being made to the valve as illustrated, with the power operator at the top, and with a vertical rotational axis for the valve element. It is to be understood that these terms are used merely for convenience of description since there are no structural restrictions to mounting the valve in any position, as required by the connecting conduits and location of the valve installation.

General

Figure 1:
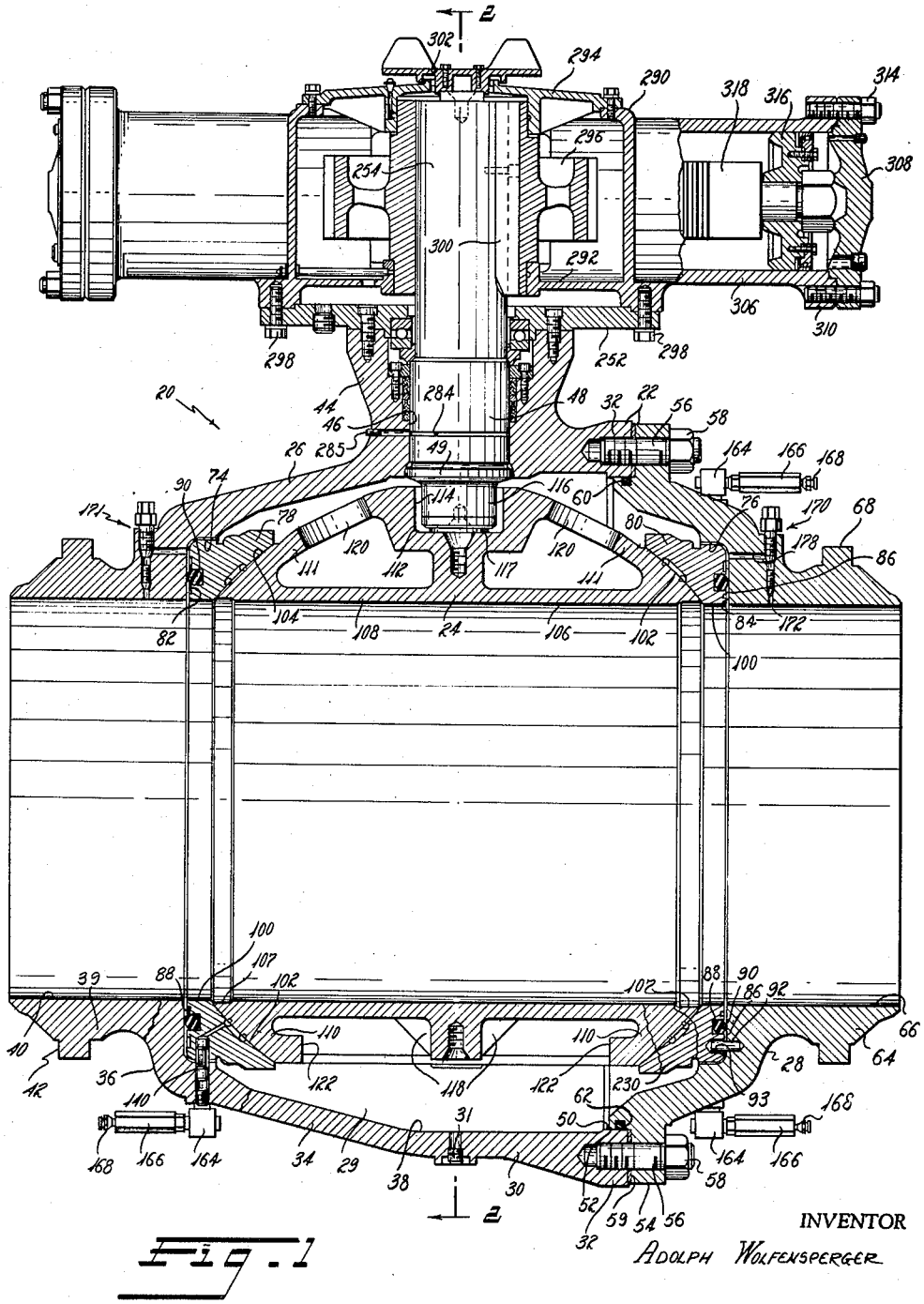
FIGURE 1 is a side elevation partially broken away and in section, illustrating a lubricated spherical zone seating or ball type valve together with its dual single acting piston actuator according to a preferred embodiment of this invention.

In the drawings, reference number 20 identifies the valve assembly of this invention which includes a two-part valve body casing 22 enclosing a hollow core rotatable ball plug 24 and having spaced zoned spherical seating surfaces. As illustrated in FIGURE 1, casing 22 consists of two portions rigidly fastened together, a major substantially cylindrical portion 26, and a slightly dished end portion or tail piece 28. The two portions 26 and 28 provide the complete valve body 22 with an internal cavity 29 containing the ball 24 and the seat rings to be described.

Major body portion 26 has a peripheral axially directed generally cylindrical wall 30 with the right hand end formed as a mounting flange 32 for the tail piece 28. A drain plug 31 is provided at the bottom. The opposite end portion 34 of peripheral wall 30 has a convergent generally conical taper ending in an integral end wall 36. The internal peripheral surface 38 of the major body part 26 constitutes the major portion of body cavity 29 and is partially cylindrical and partially convergent like the wall 30, 34 with a major diameter slightly greater than that of the ball plug 24 to permit insertion of the ball into the cavity. Sufficient clearance is provided between the ball 24 and the body wall surface to enable controlled full floating displacement of the ball and unimpeded passage of fluid around the ball within the body cavity 29. A cylindrical flow passage 40 is provided through end wall 36 of body part 26 and within extension 39 which has a test mount flange 42, both the extension and flange being integral with end wall 36. The upper portion of cylindrical wall 30 includes an integral apertured boss 44 with the bore 46 being provided with specific grooves and shoulders, to be hereinafter described, permitting installation of a valve plug operating stem 48. Stem 48 is inserted through bore 46 from within the body cavity, prior to assembly of the ball 24 and tail piece 28, as far as permitted by shoulder 47 and rim 49.

The inner periphery 50 of the mounting flange 32 is machined to provide a cylindrical pilot bore for a complementary cylindrical locating shoulder 52 provided on the joining flange 54 of tail piece 28 which is spigoted in mating relation with body portion 26 whereby the shoulder 52 rests within pilot bore 50. The two mounting flanges 32 and 54 are fastened together as by studs and nuts 56 and 58. Suitable shims 59 may be used between the flanges 32 and 54 to provide proper assembly clearance and a sealing O-ring of rubber or the like 60 is compressed in an annular groove 62 provided around the locating shoulder 52. Tail piece 28 includes an integral end extension 64 similar to that on body portion 26, formed with a cylindrical flow passage 66 which in assembly is coaxial with flow passage 40. Extension 64 has a test mount flange 68 similar to mounting flange 42. The conduits at the open ends of both flow passages 40 and 66 are secured as by welding to pipe line conduits. By accurately co-aligning the tail piece flow passage 66 with the cylindrical locating shoulder 52 and similarly co-aligning the flow passage 40 in body part 26 with pilot bore 50, accurate co-axial assembled alignment of the two flow passages 40 and 66 will be assured.

Valve body 22 may be made in a manner other than that disclosed, which illustrates the major portion of the valve cavity 28 in one portion and a minor portion of the cavity in the tail piece. For example, the major part of the valve body may be entirely cylindrical and include the entire valve cavity while the tail piece would constitute a substantailly flat plate fastened to the closure mounting flange of the major portion; or the valve body could be formed as two substantially semi-spherical portions split along the stem aperture. The specific illustrated two piece valve body has been designed to provide one portion with a rigid apertured valve stem extension wholly integral with that body portion, and to provide a body shape using the least amount of material. It will be noted that the tapered section of body 26 plus the location of the mounting flange 32 closely adjacent the stem extension 44 will require the minimum amount of total metal in both body portions 26 and 28, which in such large valve installations constitutes a substantial saving in weight and cost.

An annular shoulder recess 74 is provided within the body portion 26 at the junction of the convergent wall 34 and end wall 36, and, in assembly, is substantially coaxial with and the same size as a similar annular shoulder recess 76 in the inner surface of tail piece 28 adjacent its fluid passage 66. The cylindrical walls of recesses 74 and 76 have a diametral dimension which is greater than that of the valve seat rings 78 and 80 which are axially slidably therein. The exact radial clearance between the seats and the valve body is not critical within close tolerances, and hence the cylindrical peripheries of recesses 74 and 76 need not be machined with high accuracy. In practice a diametral clearance of about 0.015 inch is provided. The axially directed bottoms of recesses 74 and 76 are provided with smooth flat surfaces 82 and 84 perpendicular to the axis of flow passages 40 and 66 backing the valve seat rings 78 and 80.

Seat rings

Seat rings 78 and 80 are preferably made of high tensile iron, for cost consideration, but may be made of other suitable rigid metals or non-metals. Each seat ring has a substantially flat smooth end face 86 containing an annular groove 88 for receiving a sealing ring 90 of synthetic rubber or other suitable resilient material to effect a deformable fluid tight seal with surfaces 82 and 84 of recesses 74 and 76. Rings 90 may be of circular, rectangular or any suitable cross-section. O-rings 90 which when relaxed are preferably of circular cross-section are of a sufficient diameter relative to the depth of grooves 88 to result in their compression between the seat rings 78 and 80 and the valve body recesses in the assembly by an amount greater than the total relative axial displacement between the seat rings and the plug and the body. This assures that the resilient biasing force of the upstream O-ring 90 will tend to maintain that ring and the ball in substantial surface abutment when the downstream O-ring 90 is compressed and the plug and downstream seat ring shifted axially due to line pressure. For ordinary temperature ranges, O-rings 90 are preferably fabricated from oil resistant synthetic rubber, but where higher temperatures are encountered, rings of "Teflon," "Silastic," or like plastics may be used. Each seat ring 78 and 80 is maintained non-rotatable about its axis relative to the valve body by a single axial dowel pin 92 slidably projecting from the valve body into an enlarged bore 93 in the seat ring. This pin 92 primarily prelocates the seat ring so its lubricating groove ends will be properly circumferentially situated for functional cooperation with dwarf lubrication grooves in the plug, as will be fully described hereinafter.

With seat rings 78 and 80 having freedom for slight axial displacement in the valve body there may be a tendency for foreign particles in the line fluid to accumulate in the clearance space between the surfaces 82 or 84 and the end faces 86 of the seat rings. To decrease this tendency, shallow grooves 94 and 96, shown in detail in FIGURES 5 and 7, separate the plane seat surface of each seat ring 78 and 80 into relatively narrow annular lands 98 that do not have the same tendency to trap foreign particles as would a wide flat seat surface. Removal of a portion of the seating surface will increase the bearing pressure at the end face of the seat rings but initial convergent action of the seat ring into its recess will result in high pressure ejection of fluid from between the lands 98 and the plane recess surfaces 82 and 84, tending to carry any foreign particles away from the narrow bearing areas and into the grooves 94 and 96 or away from the seat rings into the flow passages or the valve body cavity.

The bores 100 of seat rings 78 and 80 are cylindrical and substantially the same size as flow passages 40 and 66 and, as previously described, will be maintained substantially coaxial with those flow passages, slight coaxial deviation being permitted by the radial float arrangements of the seat rings relative to the valve body. Rings 78 and 80 are provided with annular spherically concave seating surfaces 102 for cooperation with the spherically convex seating surface zones of the ball 24, which latter is provided with a cylindrical through port 106 at least as large as the flow passages 40 and 46. The ring bores 100 (FIGURE 7) may be of slightly larger diameter than flow passage 66 and plug port 106 to permit a slight radial displacement of the rings without projecting an edge of the bore 100 into the line of flow of fluid through the port 66. Similarly, the ends 107 of the through port 106 are of slightly larger diameter than the ring bores 100 to permit slight misalignment between the plug port and ring bores without projecting the ball port lips into the line of flow of fluid. The edges of the flow passages 40 and 66, the ring bores 100 and the ball port 106 are chamfered to further enable smooth flow of fluid in valve open condition.

The diametrical ratio of the port orifice to the ball diameter may be varied depending upon the line pressures and valve sizes. Ratios of as high as 3.0:1.0 or more, or as low as 1.4:1.0 or less, may be desirable depending upon the valve size, line pressures and operating torque desirable. The disclosed embodiment utilizes a ratio of 1.61:1.

Ball plug

Figure 2:
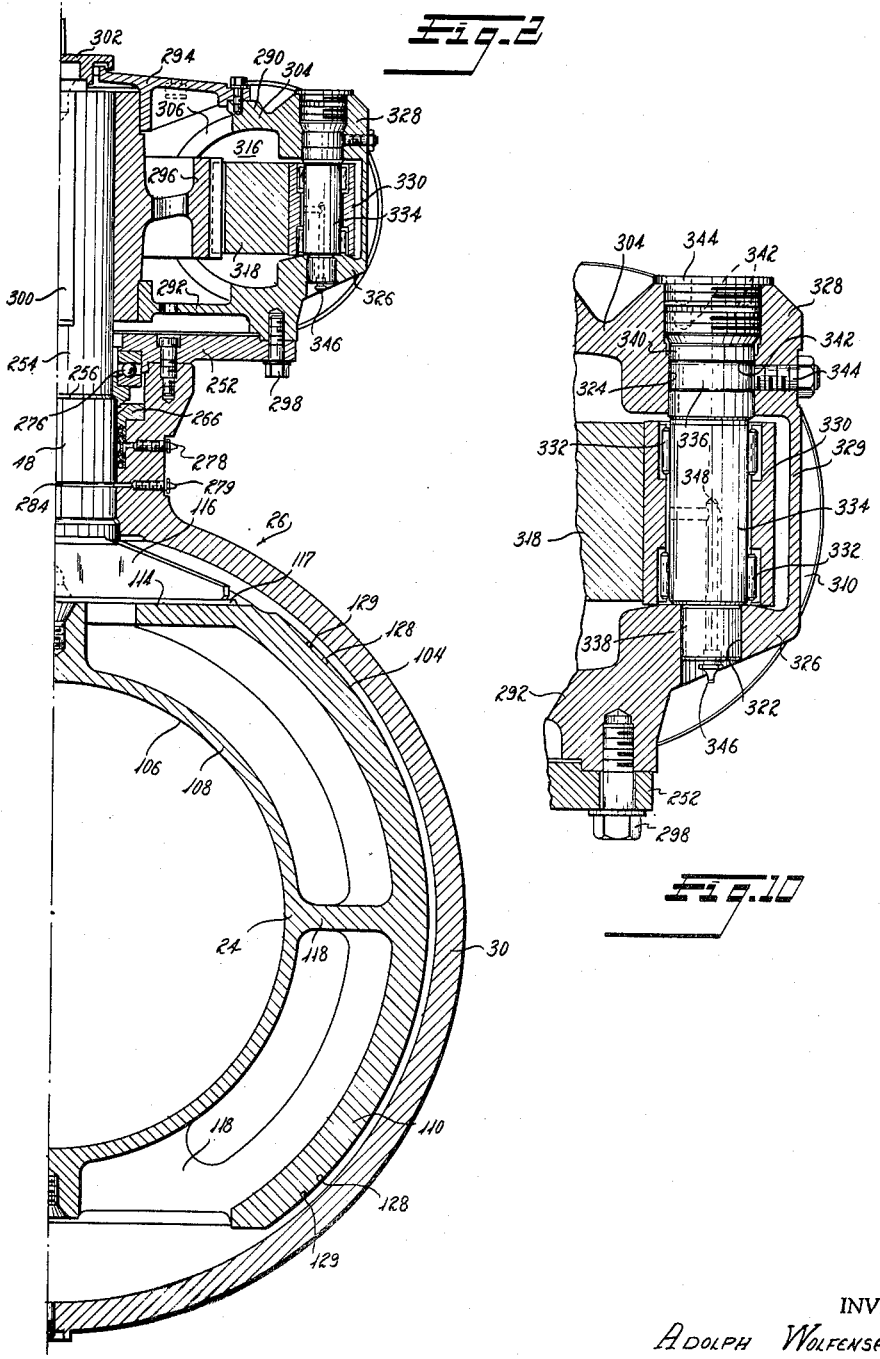
FIGURE 2 is one-half of a vertical section taken on lines 2—2 of FIGURE 1, showing the cored side wall of the spherical plug and the power operator rack, pinion, and guide, the other half being symmetrical and not shown.
Figure 4:
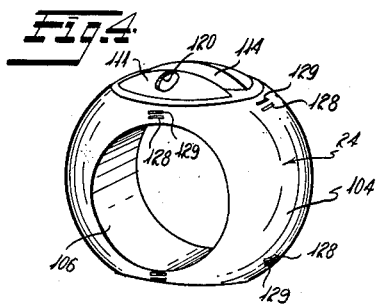
FIGURE 4 is a small perspective view of the spherical plug.

With reference now to FIGURES 1, 2 and 4 the hollow cored ball plug 24 with through port 106 will be described. To reduce the weight of the plug, that portion of the plug opposite its connection to an actuating stem and not including any necessary seating or journalling structure, may be substantially removed to provide a flat circular portion at the base of the ball 24. The ball plug of this invention is made by using preformed cores during casting to provide a rigid body structure having relatively thin flow passage defining walls 108 and slightly heavier spherically surfaced walls 110 to provide the ball seating surfaces. The upper portion of the plug 24 has an outer spherical wall section 110, slightly smaller in diameter than the diameter of the spherical seating surface 102, integrally joined with a heavy portion 112 extending approximately transverse to the axis of through port 106. Formed in the exterior upper wall section 110 in the heavy transverse portion 112 is a cross groove 114 for receiving the tang 116 of the operating stem 48. The bottom surface of tang 116 is flat and has about 0.010 to 0.030 inch sliding clearance with a flat ledge 117 on the ball groove. A clearance is provided between tang 116 and the groove walls 114 to enable proper radial and axial floating movement of plug 24 and permit alignment and displacement with seat rings 78 and 80. Appropriate internal rib reinforcing structures 118 are integrally cast between the spherical wall portions of the plug 24 and the cylindrical wall 108, and are provided with through core passages. Holes 120 in the top wall 110 of plug 24 are formed by core prints during casting but adequately serve to reduce overall plug weight. At the diametral top and bottom of through port 106 two bosses appear which include countersunk pilot openings. These bosses, used in the final machining of the spherical seating surfaces on the ball, have no specific function in the assembled valve.

The edges of the open bottom of spherical wall 110 may be reinforced by thick rim portions 122 to provide additional rigidity to the portion of the spherical seating surface coacting with ring seats 78 and 80. The spherical ball surfaces coacting with the accurately machined annular spherical zone surfaces 102 on ring seats 78 and 80 are also accurately machined for close and accurate fit on the same curvature with the ring seat seating surfaces.

Although the actuating stem tang 116 fits with a clearance in groove 114 the ball will still be substantially maintained with through port 106 coaxially aligned with flow passages 40 and 66 when the valve is in open position since the control coaction between tang 116 and groove 114 is such that only a very minor amount of rotative play is permitted to ball 24.

Figure 3:
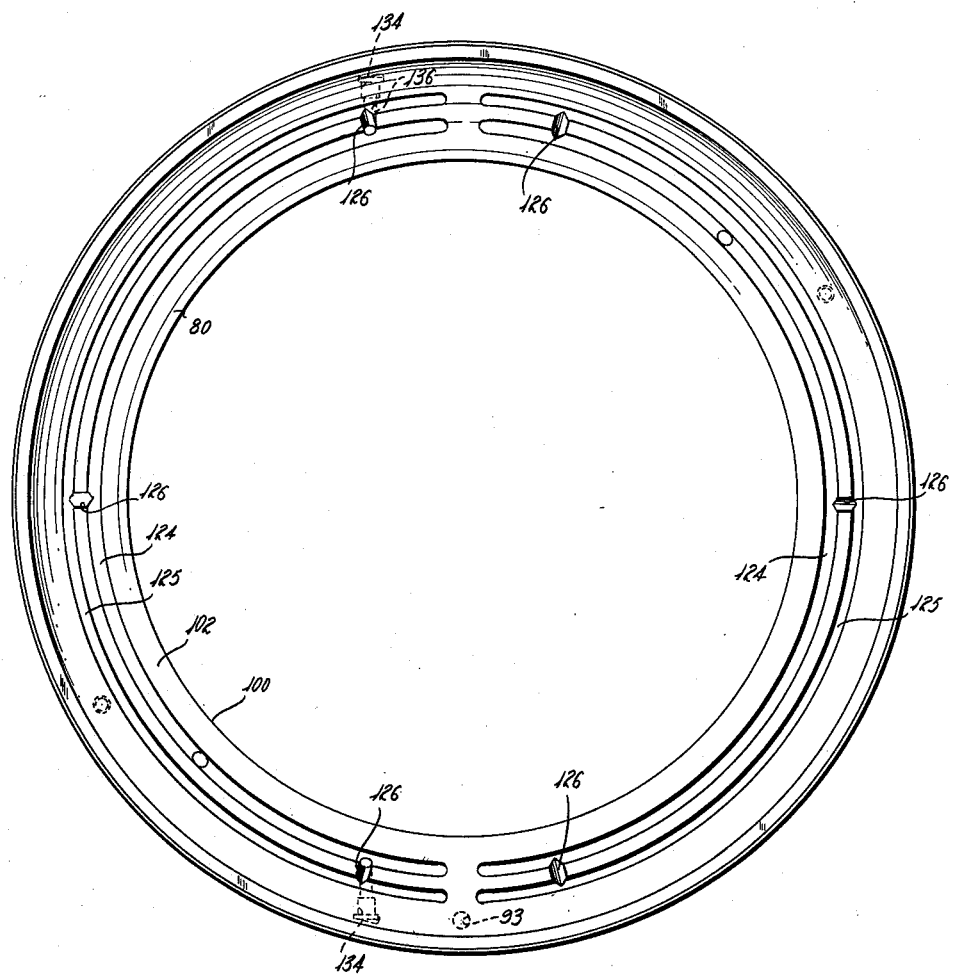
FIGURE 3 is a vertical elevation of one of the floating ring seats looking at the spherically formed seat.
Figure 7:
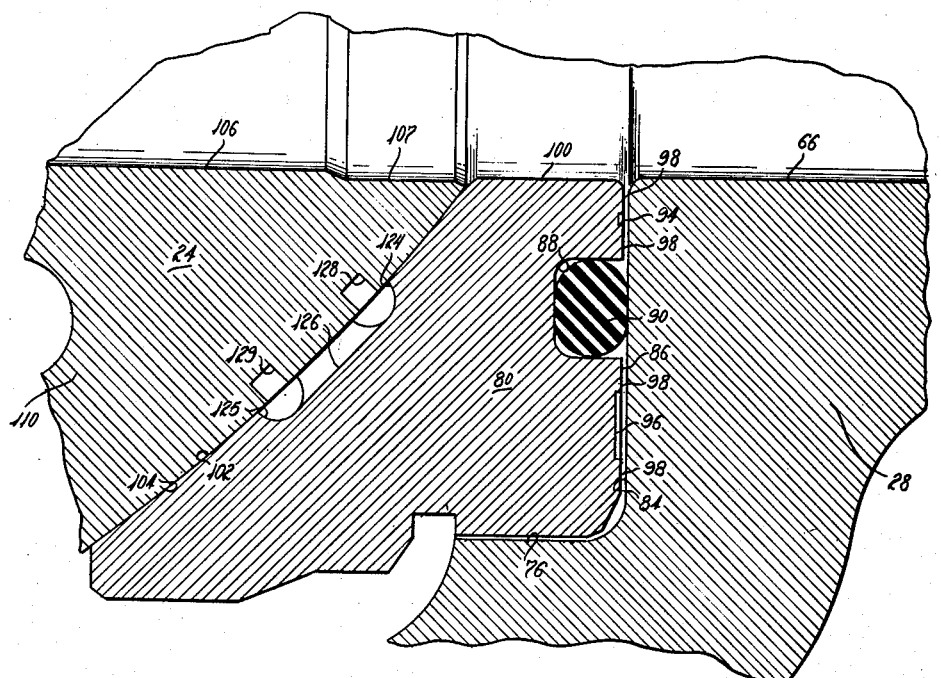
FIGURE 7 is an enlarged detail section showing coaction of the valve body and the seat rings.

As shown in FIGURES 3, 5 and 7, each valve seat ring 78 and 80 has its spherical seating surface 102 provided with two concentric sets of side by side parallel shallow annular lubricant grooves 124 and 125. Each set is discontinuous for a short extent at the top and bottom separated by portions of the spherical seating surface 102. The lubricant grooves 124 and 125 may be of substantially uniform depth if so desired, but the preferred embodiment of semi-circular cross-section is used because it will provide a large ready flow duct area for transmitting lubricant around the relatively large circumference of the seat ring 78 and furthermore such grooves can be cut by standard spherically ended milling cutters to reduce manufacturing costs. Several short cross ducts 126 connect the two seat grooves 124 and 125 at spaced intervals to supply lubricant uniformly to both grooves. The exact number of short cross ducts 126 may be more or less than the six illustrated in FIGURE 3, without altering their principal function. The reason for using a plurality of the short ducts is to assure that lubricant under pressure admitted into one groove is transmitted to all unclogged parts of the grooves 124 and 125 even if local clogging were to occur.

With reference to FIGURES 1, 2 and 4, ball 24 is provided with a double set of dwarf grooves 128 and 129 at 90° intervals around the top and bottom margins of the spherical seating surface. These dwarf grooves are long enough to bridge the discontinuities or lands between each of the lubricant grooves 124 and 125 in the ring seat spherical surface in either the valve fully opened or fully closed positions, which positions are 90° apart and determined by suitable coacting stops (not shown) on the stem and valve body. When the lubricant grooves 124 and 125 are bridged at their discontinuities by dwarf grooves 128 and 129, the lubricant grooves and the plastic lubricant contained therein become effectively continuous about the ball on the opposed seating surfaces contacted by the seat rings.

According to accepted theory the amount of hydraulic force required for jacking the ball and seats axially apart is a function of the area of the lubricant grooves multiplied by the unit fluid pressure exerted on the plastic lubricant within the grooves. The two relatively narrow grooves of this structure have been found to give a substantially greater effective jacking force than one groove having an effective jacking area equal to that of the combined smaller grooves. This enables the use of a plurality of narrow grooves having less total cross-sectional area than one groove would have to produce the same jacking action. Using two grooves in lieu of a single groove with less total cross-section than the single groove, a greater sealing surface area between the rings and the ball is provided to reduce the unit area pressure but still obtain a desired high jacking force. Alternatively, the two grooves may have a total cross section area equal to the single groove, providing equal sealing surface but enabling a higher jacking force. The plug and seat ring arrangement is not limited to the use of only two concentric grooves as the invention contemplates the use of any desired number to provide the effective jacking force required. The grooves 124 and 125 are adapted to receive a fluent plastic material which, in addition to transferring the jacking force between the plug and seats, also seals and lubricates the plug seating surface.

Lubricant fittings

With reference to FIGURES 1 and 3 and enlarged detail FIGURE 5 each seat ring 78 or 80 is provided with at least one and preferably two substantially radial lubricant introduction bores 134 each intersecting a diagonal passage 136 which in turn communicate with one of the two lubricant grooves 124 and 125. As illustrated in FIGURE 3 these bores 134 are both located to one side of the vertical centerline so that they communicate always with only one set of grooves. This insures that the set of grooves at the right of FIGURE 3 which is exposed to line fluid action when the ball is turned is cut off from the source of lubricant under pressure except in fully open and closed valve positions. When the seat rings 78 and 80 are assembled in the body recesses 82 and 84 and circumferentially located by dowel pins 92 their substantially radial bores 134 will be aligned with bores 138 in the adjacent portions of the body portions 26 and 28. As illustrated in FIGURE 5 the diameter of ring bore 134 is less than that of body bore 138 to provide ease of alignment between the bores 134 in seats 78 and 80, which have axial play as previously mentioned, and the fixed location, of the body bores 138 and facilitate insertion if a lubricant conducting bushing 140. The differential diameters also serve to permit a universal rocking movement of the special non-flexible lubricant bushing 140. The rigid lubricant bushing 140 is shaped with enlarged short cylindrical end portions 142 and 144 of diameters providing adequate clearances with ring bore 134 and body bore 138 to permit limited rocking. This provides for substantially universal rocking of the bushing 140 while maintaining an outer peripheral seal. Annular grooves 146 and 148 are provided respectively in ends 142 and 144, the grooves being provided with resilient O-rings 150, 151 and leather back-up rings 152, 153. These O-ring and leather ring combined seals are designed to hold very high pressures of the lubricant material acting away from the ends of the bushings toward the space between the seat rings and the valve body. As shown in detail FIGURE 6, each of the inboard lands 156 and 157 of the two end seal portions 142 and 144 are dimensioned to provide a relatively close clearance to the wall of their respective bores 134 and 138 to prevent any possible extrusion of the O-rings between the spherical land portions and the bore walls by the very high lubricant pressures. The outboard lands 159 and 160 function mainly to retain the O-rings and back-up leather rings in position at the end of the bushing. Working lubricant pressure will force the seal rings against the inboard lands. The outboard lands have a greater clearance from the bore walls to permit the lubricant bushing to rock about the inboard lands 156 and 157 during seat ring displacement. The inboard and outboard clearances may be obtained by removing a slight portion of the spherical lip at each edge of the grooves 146 and 148, thereby providing a narrow cylindrical surface. It is important that the width of the cylindrical surface on the inboard lands be held to a minimum to prevent any tendency of the land from binding when the bushing rocks in the bore.

The lubricant bushing can be designed for use in passing through a space containing high pressure and connecting two lower pressure ducts or passages. Such a bushing would have the outboard lands closely fitted within the ducts or passages and the inboard lands relieved to allow for rocking motion.

With bushing 140 properly placed in position to cooperate between the seat rings and valve body in bored passages 134 and 138, one or more compressed Belville type disc spring washers 162 are positioned on top of each bushing and ensure the bushing being fully inserted and retained in its ring bore yet permitting universal rocking of the bushing. A check valve 164 is threaded into a tapped outer end of the body passage 138 and abuts and retains spring discs 162 against the bushing 140. Spring 162 takes up axial clearance in the assembly but permits rocking of bushing 140. Each check valve 164 is sealed against the valve body by an annealed steel seal ring 165 and is provided with an extrusion screw lubricator 166 which may be filled through lubricant fitting 168. The ball 24 rotates in predetermined directions through 90° between fully open and fully closed limit positions respectively. These lubricators and associated passages 136 are so located with respect to the direction of valve rotation that the set of seat grooves 124, 125 which is exposed to line fluid is cut off from passages 136 and there is no undue loss of lubricant into the line. Passages 136 are connected into the set of seat grooves 124, 125 that is not exposed to line fluid during opening and closing of the valve, and hence even during an intermediately open position of the valve a substantial seat surface separation pressure may be applied between the ball and seat ring. This lubricator may be the type disclosed in copending United States application Serial No. 371,884 filed August 3, 1953 by C. R. Rieff, now Patent No. 2,776,026 granted Jan. 1, 1957. After the lubricator 166 is filled with lubricant, subsequent applications of pressure lubrication may be obtained by turning the lubricant screw head portion 169 with a suitable wrench. The check valve ball 167 is not backed by a spring because in installations using high viscosity lubricant it is often the practice to eliminate such check valve springs. However, if it is desired, a spring backed ball check valve may be used. The difference in the radii of passageway 134 in valve seat 80 and the valve body passage 138 is at least equal to the total axial play which is possible between the seat rings 78 and 80 and the valve seat recesses 82 and 84, otherwise structural interference may occur between the bushing wall and the side wall of bore 138. This bore diameter difference could be alleviated by materially reducing the diameter of the bushing portion between each of its spherical end portions. However, since the relatively heavy walled bushing 140 must withstand high lubricant pressures and since providing the ring seat bore 134 with a smaller diameter than the valve body bore 138 enables greater ease of assembly, the illustrated structural relationship is that which is preferred.

*By-pass valve assemblies*

FIGURES 1 and 2 disclose considerable space between the inner peripheral surface of the body casing 22 and the outer surface of the ball 24. This enables passage of line fluid throughout the complete body cavity and completely around the ball between the seat rings. The aforementioned hollow core ball 24 with the core print holes 120 permit such fluid to pass around the ball 24 and into its interior completely surrounding the cylindrical wall 108 around the through port 106. Means for introducing line fluid under pressure from whichever flow passage is upstream are provided in each of the body portions 26 and 28. Only one of these means is usually operative to permit fluid flow at a time depending upon the direction of fluid flow in the service installation. To this end by-pass check valve assemblies 170 and 171 are provided respectively in the radial portion of tail piece 28 and the end wall 36 of body portion 26 (FIGURE 1). As both assemblies are identical, only the tailpiece by-pass check valve will be described. Shown in enlarged detail FIGURE 5, a radial passage 172 passes from tail piece flow passage 66 to the exterior of the tail piece and has two successive tapped counterbores 174 and 175. At the transition between tapped counterbores 174 and 175 an axial passage 178 intersects the passage 172 and passes to the interior of the valve body cavity at tail piece recess 84. This introduces line fluid pressure directly to the rear surface of the seat ring. The chamfered outer edge 180 of seat ring 80 provides fluid communication between passageway 178 and the annular side wall clearance between the ring 80 and the circumferential wall 76 of the recess 84. Thus line fluid is permitted to pass from the tail piece flow passage 66 through passageways 172 and 178 into the body cavity 29.

Threaded into and tightly seated at the bottom of counterbore 174, a special check valve 182 is arranged to permit fluid flow only in the direction from flow passage 66 into the body cavity. Check valve 182 has a reduced portion at its lower end coacting with a seal ring 184 compressed between the check valve casing and a seal seat counterbore 186 adjacent the lower end of passage 172.

Threaded into the upper tapped counterbore 175 above check valve 182 is a high pressure needle valve assembly 188 having a cylindrical casing 190 with a small diameter cylindrical end portion 192 provided with an external annular groove 193 retaining a high pressure triple seal 194. Seal 194 consists of a resilient rubber O-ring 195 backed on either side by leather seal rings 196. An intermediate portion of needle valve casing 190, of larger diameter than end 192, is threaded to cooperate with the upper tapped counterbore 175 and maintains the needle valve assembly 188 within the passage 172. The upper end of needle valve casing 190 is increased in diameter and provided with shoulder 198 tightly seated on a steel seal ring 199 disposed in an annular recess 200 at the exterior end of passage 172. An axial drilled passageway 202 is provided in the needle valve casing 192, terminating in lower end wall 204. A tapped aperture 206 extends from the drilled passage 202 through end wall 204 and receives a needle valve seat 208. Between the cylindrical end section 192 and the intermediate threaded section 197, radial drilled passages 210 pass through the valve casing wall and intersect the drilled passage-way 202. When the needle valve assembly is threaded into the tapped counterbore 175 and tightly seated against the ring 199 radial passages 210 will be disposed adjacent the larger diameter counterbore 175 and directed toward passage 178 into the valve body cavity. That portion of drilled passageway 202 in the needle valve casing above radial passages 210 is tapped to receive a threaded section 212 of the valve needle 214. Immediately above the threaded section 212, valve needle 214 has an enlarged grooved mid-portion 216 disposed in an enlarged counterbore 220 of the passage 202 and, when the needle is turned to open and closed positions, its mid portion 216 with seal element 218 moves axially along the counterbore 220 and the triple ring seal provides an effective high pressure axially slidable seal fitting. The upper end 222 of valve needle 214 is headed for cooperation with conventional wrenches whereby the valve needle may be turned to and from the closed position. The upper end of needle valve casing 190 is formed with a large diameter tapped counterbore 224 receiving a threaded cap member 226 for enclosing the needle valve 183.

The purpose of the by-pass check valves 170 and 171 at both fluid passage ends of the valve body is to introduce upstream line pressure into the body cavity surrounding the plug element independently of flow direction. This equalizes the pressure around the upstream seat ring and prevents it from being forced with high differential pressures against the spherical seating surface, thus reducing frictional drag on the ball when it is operated. Without this by-pass, if the upstream seat ring tightly seats against the ball with the cavity around the ball at lower than line pressure, the high upstream pressure acting against the O-ring 90 between the valve body and the upstream seat ring will cause that seat ring to bear too heavily against the spherical seating surface on the plug element. By balancing the pressures and reducing the upstream seat ring seating action a substantial reduction of operating torque is realized.

The purpose of needle valves 188 is to selectively cut off the application of line pressure to the back of the upstream seat ring and assure means for obtaining a gas tight seal in the event the downstream check valve fails to seat. Both needle valves are normally opened, but the downstream needle valve can be closed if leakage occurs through its related check valve when the valve 20 is in closed position. The upstream by-pass valve must be open to reduce torque required to turn ball 24.

Experimentally it has been determined that line fluid pressure enters the valve body cavity whether or not the valve is open. The needle valve at 214 however acts as a safety device against accidental closing of clearances which would prevent such pressurizing of cavity 29 and provides for positive introduction of line fluid pressure into that cavity.

With respect to FIGURES 1 and 3, it will there be seen that each seat ring 78 and 80 is provided with two radial passages 134 for introducing lubricant to the distribution grooves 124 and 125 and similarly each seat ring cooperates with two lubricant bushings 140 and their associated check valves 164 and lubricators 166. Although one lubrication assembly for each seat ring 80 can be sufficient, two or more are preferred located at opposite ends of the seat groove lengths to assure a speedy and sure distribution of the plastic lubricant throughout the entire extent of the lubricating grooves. Whether one or two lubricant assemblies are used, the lubricant is introduced to the ring grooves 124 and 125 on the sides which always contact the plug spherical surface when the plug is being turned between fully open and fully closed positions, so that as explained previously a lubricant flow path from the lubricant assemblies will never be open directly into the port 106.

*Actuating stem*

Figure 8:
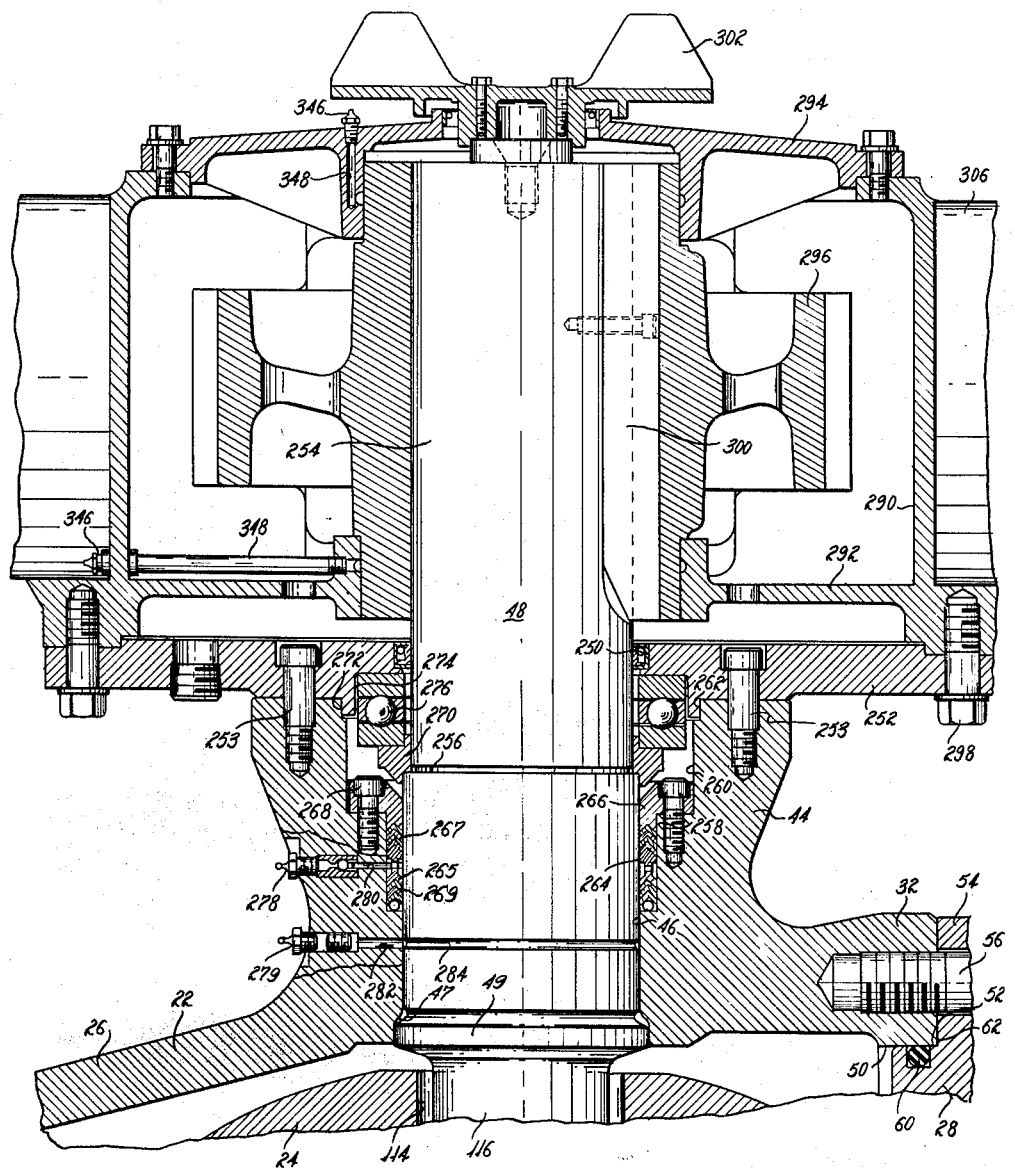
FIGURE 8 is an enlarged detail section of the actuator stem, bearings and lubricating fittings.

With reference now to FIGURES 1, 2 and particularly FIGURE 8, the actuating stem 48 is separable from the plug 124 and would normally rest by gravity in the transverse groove 114 at the top of the plug if the body cavity were not under upstream line pressure. The tang 116 of stem 48 is elongate and extends substantially the longitudinal extent of plug groove 114 with the aforementioned clearance enabling slight axial and radial displacements of the plug element 24 relative to the stem and valve body casing 22. The stem 48 projects through the valve casing extension bore 46 and extends through an aperture 250 centrally located in a valve operator adapter 252 bolted to the upper face of the valve body extension 44 by screws 253. Stem 48 is specifically designed to be axially restrained from outward displacement under the high differential pressures resulting from admission of line pressure to the body cavity of the valve casing. To counteract this outward force the stem upper end 254 is reduced in diameter and provides an annular shoulder 256 disposed within the extension 44. The extension bore 46 includes three successive counterbores 258, 260 and 262. Received between the walls of counterbore 258 and stem 48 is a high pressure compressible V-ring seal assembly 264 maintained in position by a retaining ring gland 266 disposed within the middle counterbore 260 and held therein by screws 268. Immediately above the retaining ring gland 266 a thrust washer 270 is closely fitted upon the reduced upper portion 254 of stem 48 and abuts the annular shoulder 256. The operator adapter 252 has a depending annular lip 272 and maintains it axially against thrust washers 270. Thus it will be understood that all outward radial thrust on the actuating stem 48 will be absorbed through thrust washer 270, thrust bearing 276 and adapter plate 252 to, in effect, maintain the stem 48 in a fixed axial position.

Check valved lubricant admission fittings 278 and 279 are provided for respectively introducing sealing lubricant under pressure to the center of the V-ring seal 264 by means of passageway 280 and lubricating the valve stem 48 by means of radial passage 282 connecting with an annular groove 284 in the lower portion of the valve stem. On the opposite side from fitting 279 a radial passage from groove 284 is provided with a pipe plug 285 for bleeding off through groove 284 and the associated radial passage leakage of line fluid which may escape between shoulder 47 and rim 49 while stem packing 264 is being replaced.

The annular seal assembly at 264 comprises a bronze ring 265 with compressible annular packing rings 267 and 269 above and below that are compressed when the gland 266 is drawn tight. Lubricant under pressure is introduced through passage 280 to fill the inner and outer annular grooves of ring 265 and thereby provide a fluid tight seal around the stem at that point. When lubricant under pressure is forced into groove 284 its spreads within the bore 46 to increase the effectiveness of the seal. It will be noted that the bottom of bore 46 is enlarged for a short distance to provide shoulder 47 which is adapted to be engaged by the enlarged rim 49 on stem 48 to limit upward movement of the stem. When the parts are assembled as in FIGURE 8 rim 49 is spaced from shoulder 47, but when the parts at the top of boss 44 are removed, as for replacing the packing, contact of rim 49 with shoulder 47 limits upward movement of the stem 48 and together with the seal at groove 284 keeps the valve stem fluid tight against outward leakage of line pressure.

The foregoing lubrication means for the threadless stem 48 spread lubricant over the stem surface to protect against corrosion and facilitate turning of the stem.

*Operator*

The valve operator illustrated in FIGURES 1, 2, 9 and 10 comprises a central body 290 with an apertured lower wall 292 and an apertured cover member 294 cooperating to journal an operating pinion gear 296 in axially fixed assembly. The housing member 290 is fastened to adapter plate 252 by bolts 298 whereby the upper end 254 of valve stem 48 projects coaxially through the pinion 296 and is drivingly engaged therewith by a key 300. A valve position indicator 302 is fastened to the top end of stem 48 and cooperates with the cover member 294 to form a dust shield about its central aperture.

Positioned on opposite sides of the pinion gear 296 and rigidly fastened to the operator body 299 are elongate tubes 304 including cylinders 306 at each end. The ends of each cylinder 306 are closed by closure members 308 fastened to cylinder end flanges 310 by studs 312 and nuts 314. Disposed within each cylinder 306 is a single acting piston 316 with a rack 318 rigidly interconnecting the two aligned pistons 316 in each set. This provides a set of opposed single acting piston rack assemblies on diametrally opposite sides of pinion gear 296 resulting in a balanced torque couple between the two racks 318 and the pinion and also a balanced side thrust between the racks and pinions on the valve stem thus eliminating any bending stresses in the stem, which increase frictional drag and operating torque.

Figure 9:
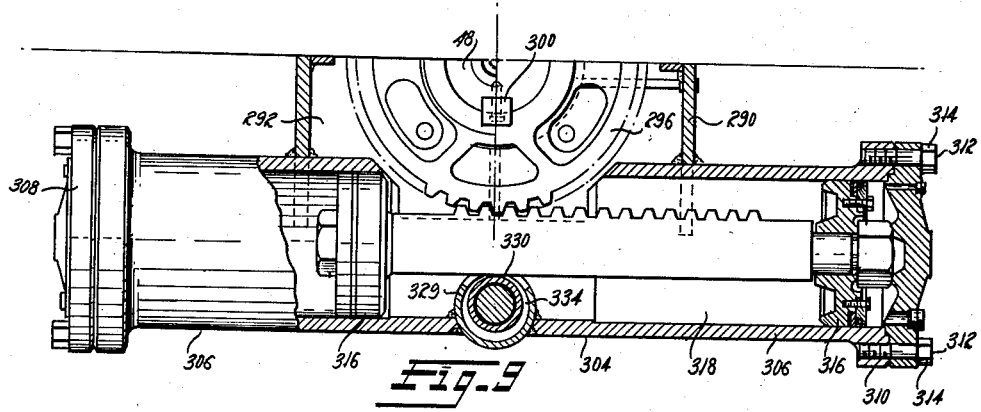
FIGURE 9 is a top plan view showing the power operator unit in partial section.

Disposed at the back of each of the racks 318, substantially on a radius from the axis of the valve stem and pinion 296 through the meshed teeth of the pinion and rack, is an adjustable rack guide 320. The present invention incorporates a material improvement to substantially reduce the friction drag between the guide and back face of the gear rack. In FIGURES 9 and 10 the guide assemblies 320 are positioned between aligned apertures 322 in spaced lower and upper walls 326 and 328 of sleeves 329 fastened to the cylinder 304. The guiding elements are rollers 330 journalled by roller bearing sets 332, at each end of the roller, on an eccentric section 334 of the guide adjusting arbor 336. The lower end 338 of arbor 336 is cylindrical, disposed on an axis eccentric to that of section 334 and journalled in the lower aperture 322. The upper cylindrical end 340 is arranged coaxial with the lower end 338 and is journalled in the aperture 324 in upper wall 328. An annular groove 342 surrounds the upper end 340 and in cooperation with a locking screw 344 provides means for axially and angularly locking the adjusting arbor 336. The upper end of arbor 336 is provided with spaced recesses 342 providing means for turning the arbor by a special spanner wrench. A cap 344 is threaded into the upper open end of aperture 324 to provide a dirt and dust closure.

Rotation of arbor 336 will, through the eccentric section 334, shift the axis of guide roller 330 toward or away from the pinion gear axis and will thus enable an adjustment between the roller 330 and the back face of gear rack 318 to provide proper positioning for absorbing the cross thrust resulting from the engagement of rack teeth and pinion gear teeth during powered reciprocation. By using the eccentrically mounted roller of this invention rather than flat face guide blocks heretofore proposed there is provided a line guiding contact rather than a surface area guiding contact to materially reduce frictional drag that can assure high proportions in these large valve installations. The journalled roller 330 may be lubricated by means of the fitting 346 and internal passages 348 in the adjusting arbor 336.

*Alternate by-pass system for thermal expansion of body cavity fluid*

Whenever the previously described valve is used with certain types of fluid, such as those with a high degree of volatility, the by-pass check and needle valve assemblies 170 and 171 between the up and downstream body passages and the body cavity 29, which close as soon as pressure in the cavity is equal or higher than pressure in the body passages, may permit a considerable increase in pressure within the body cavity due to thermal expansion. To alleviate pressures due to thermal expansion of such highly volatile fluids, the by-pass arrangement 358 shown in FIGURES 11 and 12 may be used in lieu of that shown in FIGURE 5. Such an alternate arrangement allows pressure in the body cavity 29 to equalize with the upstream line pressure and prevents undesirable pressure increases within the body cavity. One of these alternate by-pass assemblies 358 is provided for each passage 40 and 66 of the valve body.

As previously described, the plug 24 and the two seat rings 78 and 80 have a small amount of longitudinal clearance for axial displacement in the valve body. When the plug is in closed position at 90° to that of FIGURE 1, it is forced into the downstream seat ring by the large unbalanced pressure force and the total longitudinal clearance of the ball and seat ring assembly where the body will be between the upstream seat face 86 of upstream ring 80, which follows the ball under line pressure, and the recess end wall 84. In FIGURE 11 that part of the annular space which exists between the end face of the seat ring and the body wall is connected to the throat of upstream fluid passage 66 by an axial drilled passageway 360 extending to the recess seat 84 and an intersecting substantially radial passage 362 extending to the passage throat. Axial passage 360 opens into the body recess 84 adjacent the surface of one of the ring lands 98. The substantially radial passage 362 is counterbored at 364 and the upper end of the counterbore is tapped. The shoulder 366, at the intersection of counterbore 364 and passage 362, is tapered to provide a valve seat. A shut-off valve member 367 is threaded in the tapped counterbore 364 and has a lower tapered end 368 adapted to coact with valve seat 366 to open and close the by-pass passage. The cylindrical portion of member 367 disposed above cross passage 360 has an annular groove 370 retaining a triple ring seal 372 similar to seal 194 on the needle valve assembly of the former embodiment. The head end of the movable valve member 367 is provided with a recessed wrench socket 374 for insertion of a proper tool to turn the valve open or closed. Immediately above the head of valve member 367 passageway 362 has a larger counterbore 376 tapped to receive a closure cap 378.

This alternative assembly constitutes a simple shut-off valve, one located at both of the flow passages of the valve body and if desired, the downstream valve may be closed when flow through the valve assembly is always in one direction. With the valve assembly 358 open, fluid can circulate between the body and the upstream line without any obstruction thus equalizing pressures between the body cavity and the upstream passage. Even if the downstream valve were to be left in the open position, whenever the seat ring is forced against the body, as shown in FIGURE 12, the ring seat land 98 closely abuts and closes the entrance to passage 360 and will prevent fluid flow from the pressurized body cavity to the downstream flow passage.

A small stainless steel bushing 380 may be inserted in the body cavity mouth of passage 360 to reduce the size of the drilled connection and also to reduce any leakage that may occur to a small amount. Upon initial assembly bushing 380 may be inserted so it protrudes a slight amount beyond the inner face of the body recess. Thus the first time pressure is applied to the valve, and the downstream seat ring is forced against the body, the seat ring land 98 will press the small bushing 380 into the passage 360 by the amount the seat ring moves after contacting the bushing. This assures a flush abutment between the end face of the bushing 380 and the land 98 on the seat ring improving proper seating and tightness between the contacting surfaces. Such installation will also take care of surface irregularities between the end of the bushing and the seat ring land.

An auxiliary modification for the by-pass valve of FIGURE 11, to provide a tight seal between the downstream seat rings and the mouth of passage 360, is illustrated in FIGURE 13. In this embodiment an annular recess 384 is provided at the mouth of passage 360 with small diagonal grooves 385 formed at the annular edge where passage 360 intersects the recess 384. Within recess 384 a cup shaped annular resilient sealing disc 386 is disposed with its convex side facing the recess. Thus, on the upstream side of the spherical valve where a clearance will exist between the seating face of the seat ring 80 and the end face of the body recess 84, the sealing disc 386 has sufficient space to retain its cup shape and will permit passage of fluid in both direction through passageway 360, the small diagonal grooves 385 and through recess 384 into the body cavity, to thus enable pressure equalization between the body cavity and the upstream fluid passage.

A similar arrangement provided on the downstream side of the ring seats because of the tight seating relation between the downstream seat ring 80 and the body recess 84, will result in a deformation of the cup shaped disc 386 into its recess 384 to tightly seal against any flow through the downstream passage 360 from the body cavity. Cup shaped disc 386 may be made of any suitable material dependent upon the type of fluid passage through the spherical valve 20.

In the foregoing description there is provided a novel ball type plug valve combined with a reversible operator for use in high pressure large diameter fluid lines and adaptable for flow in either direction, wherein the ball is of a special cored construction, reducing the ball diameter and thereby materially reducing its weight with resultant reduction in required operating torque. A further important consideration flowing from the special cored hollow ball construction rests in a material reduction in material and production costs.

The new type radially and axially floating ring seats backed by resilient O-rings provide an assembly wherein the clearances permit axial and cocked displacement of the seat rings. Manufacture is not critical within close tolerances and may be accomplished through low cost operations rather than high cost precise machining operations. The double lubricant grooves in the seating surfaces provide higher jacking forces than an equivalent area single groove. In operation, with the ball 24 turned to valve closed position, the upstream line pressure forces the ball against the downstream seat and compresses the backing ring 60 between that seat and the valve body, and also the line pressure gets behind the upstream seat ring and urges it against the ball. The axial and radial float permitted the seat rings insures full surface seating engagement of the ring and ball surfaces. When the lubricant pressure in the seat ring grooves is increased, as for jacking, the O-rings yield to provide the desired relative movement between seat ring and body until the seat rings are in solid contact with the body and upon further increase of lubricant pressure further relative movement between the seat rings and body is yieldably resisted by the body itself which will deform, chiefly axially because of its shape, under such pressure. Normally with the valve open, the compressed O-rings at both sides tend to center the ball and hold the seat rings tightly against the ball and prevent washout of the lubricant in the seat grooves, and there is a clearance of about 0.010 inch between the rear surface of each seat ring and the adjacent radial face of the valve body which is taken up as above described before the body material starts to stretch. These clearances permit lubrication of the seating surfaces when the ball is turned to open position, and when the clearances are taken up the body itself yieldably resists higher lubricant pressures. Further important contributions of this invention reside in the universally tiltable high pressure lubricant bushing conduits provided to introduce lubricant from exterior of the valve casing to each of the floating seat rings. The use of the eccentrically mounted operating rack guide roller further aids in reduction of friction drag which must be overcome by the power operator.

It is to be understood that for certain aspects of the invention the seat ring lubricant grooves are not restricted to two but may be any plurality consistent with a specific installation. Furthermore for certain aspects of the invention the actuating stem need not be the threadless type disclosed in the drawings but may be any actuating stem permitting relative axial and radial floating movement.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a ball type plug valve assembly for a high fluid pressure line, a body having a cavity, a rotatable ported ball plug supported wholly upon annular seat rings at opposite sides within said body cavity, said seat rings being mounted for limited axial and radial displacement, said ball and seat rings having coacting spherical seating surfaces, means for introducing and establishing a layer of fluent plastic lubricant and sealant between said surfaces, and means for introducing line fluid pressure into said cavity surrounding said ball between the seat rings.

2. In the valve assembly defined in claim 1, said last means comprising a passage connecting at least the upstream side of the line substantially directly into said cavity, and a shut off valve in said passage.

3. In a ball type plug valve assembly, a hollow valve body having a passage therethrough, a ported ball rotatably mounted in said body for positioning its port in alignment with said passage or for closing said passage, seat rings in said body surrounding said passage and engaging opposite sides of said ball on spherical seating surfaces, said seat rings being mounted in said body for limited radial and axial displacement with respect to said passage, resilient annular O-rings surrounding said passage and normally compressed between the body and said rings in the assembly and providing self centering of said rings and ball in the assembly, each of said O-rings being disposed in an annular groove in a radial surface of said seating rings which abut opposing surfaces on said body, and lands on said seat rings disposed on opposite sides of said annular groove.

4. A ball type plug valve assembly comprising a hollow valve body with oppositely directed fluid passages, a ported ball, axial and radially floating seat rings surrounding said fluid passages providing spherical seats for said ball, and means for introducing lubricant from the exterior of said valve body into said seats comprising related conduit sections in said valve body and said seat rings and a lubricant conduit section universally mounted at opposite ends in each corresponding respective body and seat ring conduit sections.

5. In a ball valve assembly having a hollow valve body with oppositely directed fluid passages and a ported ball seating on axially and radially floating seat rings disposed adjacent each of said fluid passages: the provision of means for introducing lubricant from the exterior of said valve body to the seating surfaces between the ball and rings comprising substantially aligned passages in said valve body and said seat rings and relatively rigid tubular conduit sections universally disposed at both ends in the respective corresponding body and seat ring passages.

6. A valve assembly as defined in claim 5 wherein each end of said conduit sections includes annular lands having smaller clearance with the associated passage wall than the intermediate portion of the conduit section between them, and high pressure fluid seals between said lands and the passage walls.

7. A ball type valve assembly comprising a hollow valve body, valve body fluid flow passages, seat rings mounted within said body around said flow passages, an open cored thin walled ball having a port therethrough substantially the size of said passages rotatably seated on said rings for connecting or closing said passages, and by-pass means between each flow passage and the interior of said valve body surrounding the ball between said seat rings to maintain the interior of body and the communicating open portions of said ball at least at upstream line fluid pressure.

8. A ball valve assembly as defined in claim 7 wherein said by-pass means includes a check valve assembly for each flow passage so disposed that fluid communication between said body interior and the upstream flow passage is permitted and fluid communication between said body interior and said downstream flow passage is prevented.

9. In the ball type plug valve assembly defined in claim 8, a flow control valve in each by-pass positively operable to open and closed position.

10. In a ball type plug valve assembly, a valve body, valve seat rings mounted for limited radial and axial displacement within said body, a relatively thin walled ported ball rotatably seated on said rings and having side openings, means including a passage through each said ring for establishing and maintaining a layer of plastic sealing and lubricant material between the seating surfaces of said ball and said rings, means on said valve body for connecting into upstream and downstream sections of a pipe line and means in said valve body providing by-passes between each of said pipe line connections to the interior of said body around said plug, said by-passes entering said body adjacent the associated seat rings so that communication therethrough is controlled by the positions of said seat rings for permitting fluid under pressure to enter said body interior and the interior of the ball from the upstream pipe line section and preventing passage of fluid under pressure from said body interior to the downstream pipe line.

11. In a ball type plug valve assembly for a high fluid pressure line, a body having opposed fluid passages, a ported ball rotatable between positions where it connects and closes said passages, seat rings surrounding said passages within the body and upon which said ball is wholly supported, said seat rings being mounted for limited axial and radial displacement, resilient seal rings axially compressed between the back of each seat ring and said body, said seat rings and ball having coacting spherical seating surfaces, distribution grooves for a sealant plastic in said surfaces, and means for introducing a sealant plastic under pressure into said grooves and establishing a layer of said sealant plastic between said surfaces.

12. A ball type plug valve assembly comprising a hollow body having end walls provided with fluid passages therethrough, annular axially and radially floating ball seat rings provided within said body adjacent each said fluid passage, seal rings resiliently biasing said seat rings away from axial engagement with said end walls, a ball maintained in floating engagement between said end walls of said body by spherical seating engagement with said seat rings and having a through port positionable to permit through fluid flow between said body fluid passages or to cut off fluid flow between said body fluid passages, a valve plug actuator extending through said body substantially perpendicular to the aligned flow passages, means connecting the inner part of said valve plug actuator with said spherical plug in a manner enabling limited displacement of said plug relative to said actuator.

13. A ball type plug valve assembly comprising a hollow body having end walls provided with fluid passages therethrough, annular axially and radially floating seat rings provided within said body adjacent each said fluid passage, seal rings resiliently biasing said seat rings away from axial engagement with said end walls, a ball maintained in floating engagement between said end walls of said body by spherical seating engagement with said seat rings and having a through port positionable to permit through fluid flow between said body fluid passages or to cut off fluid flow between said body fluid passages, a threadless valve stem extending through said body substantially perpendicular to the aligned flow passages, means connecting the inner end of said valve stem with said ball in a manner enabling limited lateral displacement of said ball relative to said stem, and thrust washer means disposed in said valve body coacting with said stem to prevent outward radial movement thereof.

14. In a plug valve assembly, a valve body having a passage therethrough, axially spaced annular seat rings surrounding the passage within the body and mounted for limited axial and radial floating movement with respect to the axis of said passage, a ported ball within said body rotatably supported substantially entirely upon said seat rings for movement between positions where it blocks fluid flow through said passage or permits fluid flow therethrough, said ball and said seat rings having contacting seating surfaces of spherical contour, said body and each seat ring having adjacent axially facing flat wall sections defining the sides of an annular chamber surrounding the passage between each seat ring and the valve body, and an axially compressed resilient O-ring seal in each such chamber having sliding contact with at least one of said wall sections.

15. In a lubricated plug valve assembly, a valve body having a fluid passage therethrough, said passage having axially aligned openings into the interior of said body and coaxial similar annular recesses in said body surrounding each of said openings, rigid annular seat rings mounted in said recesses, said seat rings having hard ball plug supporting surfaces of spherical contour facing each other within the valve body and flat rear faces adapted to contact coextensive similar flat faces within said recesses, said flat faces being normal to the axis of said passage, means defining an annular groove in one of said flat faces, plastically deformable seal ring means in said groove compressed axially of said passage, a ported ball plug within the body being supported substantially entirely by said seat rings, means for introducing lubricant into the space between said spherical surfaces, said recesses having substantially cylindrical surfaces surrounding said seat rings and said seat rings being of such external peripheral dimensions as to be capable of limited but definite radial float within said recesses, and a stem for rotating said plug extending exteriorly through an opening in said body.

16. In a valve device, in combination, a valve housing member formed with a bore therethrough; a valve arranged in said housing member, said valve being formed with a passage therethrough and being movable between open and closed positions wherein said passage is in and out of registration with said bore, respectively; and sealing means interposed between said housing member and said valve, said sealing means including an annular sealing member coaxial with said bore of said housing member, said members being so shaped as to form between themselves an annular chamber of substantially rectangular cross-section bounded by an inner face, an outer face and two side faces, and a packing ring arranged in said chamber, said ring being made of a resilient material and being compressed between said side faces of said annular chamber and having, in untensioned condition, a mean diameter corresponding approximately to the mean diameter of said chamber and a radial width smaller than the radial width of said chamber.

References Cited by the Examiner

UNITED STATES PATENTS

| | | | |
|---|---|---|---|
| 2,000,494 | 5/35 | Nordstrom | 137—246 |
| 2,148,628 | 2/39 | Laurent | 137—246 |
| 2,210,449 | 8/40 | Fleet | 251—250 |
| 2,269,886 | 1/42 | Volpin | 137—246.2 X |
| 2,516,947 | 8/50 | Blevans | 251—315 |
| 2,586,991 | 2/52 | Postel | 285—272 |
| 2,606,738 | 8/52 | McKinnon | 251—315 |
| 2,608,374 | 8/52 | Morehead | 137—246.14 |
| 2,663,538 | 12/53 | Bacchi | 251—315 X |
| 2,668,684 | 2/54 | Metzger | 251—250 |
| 2,726,104 | 12/55 | Boitnott | 285—98 |
| 2,734,715 | 2/56 | Knox | 251—315 X |
| 2,741,138 | 4/56 | Russell. | |
| 2,788,015 | 4/57 | Scherer | 137—246.16 |
| 2,796,230 | 6/57 | Grove | 251—172 |
| 2,868,498 | 1/59 | Kaiser | 251—172 |
| 2,916,254 | 12/59 | Wendell | 251—172 |

FOREIGN PATENTS

| | | |
|---|---|---|
| 511,317 | 5/52 | Belgium. |
| 530,687 | 7/31 | Germany. |
| 651,114 | 3/51 | Great Britain. |
| 759,218 | 10/56 | Great Britain. |

ISADOR WEIL, *Primary Examiner.*

WILLIAM F. O'DEA, *Examiner.*

UNITED STATES PATENT OFFICE
CERTIFICATE OF CORRECTION

Patent No. 3,180,351                          April 27, 1965

Adolph Wolfensperger

It is hereby certified that error appears in the above numbered patent requiring correction and that the said Letters Patent should read as corrected below.

Column 17, line 50, after "said" insert -- seat --.

Signed and sealed this 30th day of November 1965.

(SEAL)
Attest:

ERNEST W. SWIDER                          EDWARD J. BRENNER
Attesting Officer                            Commissioner of Patents